United States Patent [19]

Thorne-Booth

[11] 3,813,538
[45] May 28, 1974

[54] SYSTEM FOR AUTOMATICALLY CONTROLLING A LAND VEHICLE

[75] Inventor: George M. Thorne-Booth, Tarzana, Calif.

[73] Assignee: The Bendix Corporation, Bendix Center, Southfield, Mich.

[22] Filed: Oct. 4, 1972

[21] Appl. No.: 295,089

[52] U.S. Cl............ 246/122 R, 246/167 D, 340/23
[51] Int. Cl.............................................. B61l 25/02
[58] Field of Search.... 246/122 R, 66, 63 C, 167 R, 246/167 D, 182 B, 187 C; 324/173; 340/23, 32, 38 R, 21; 104/88

[56] References Cited
UNITED STATES PATENTS
3,451,350  6/1969  Bryson.................................. 104/88
3,588,494  6/1971  Mertens............................ 246/63 C FOREIGN PATENTS OR APPLICATIONS
1,036,198  7/1966  Great Britain.................. 246/122 R Primary Examiner—M. Henson Wood, Jr.
Assistant Examiner—George H. Libman
Attorney, Agent, or Firm—John S. Bell

[57] ABSTRACT

The illustrated control systems include a line running along the path to be traveled by a vehicle. Consecutive sections of the line are offset to face different locations of the vehicle as that vehicle moves along the path. The position of the vehicle along the path is identified by identifying the location on the vehicle facing the line. Control signals are then supplied to the vehicle causing it to move at a rate appropriate with its identified position.

8 Claims, 4 Drawing Figures

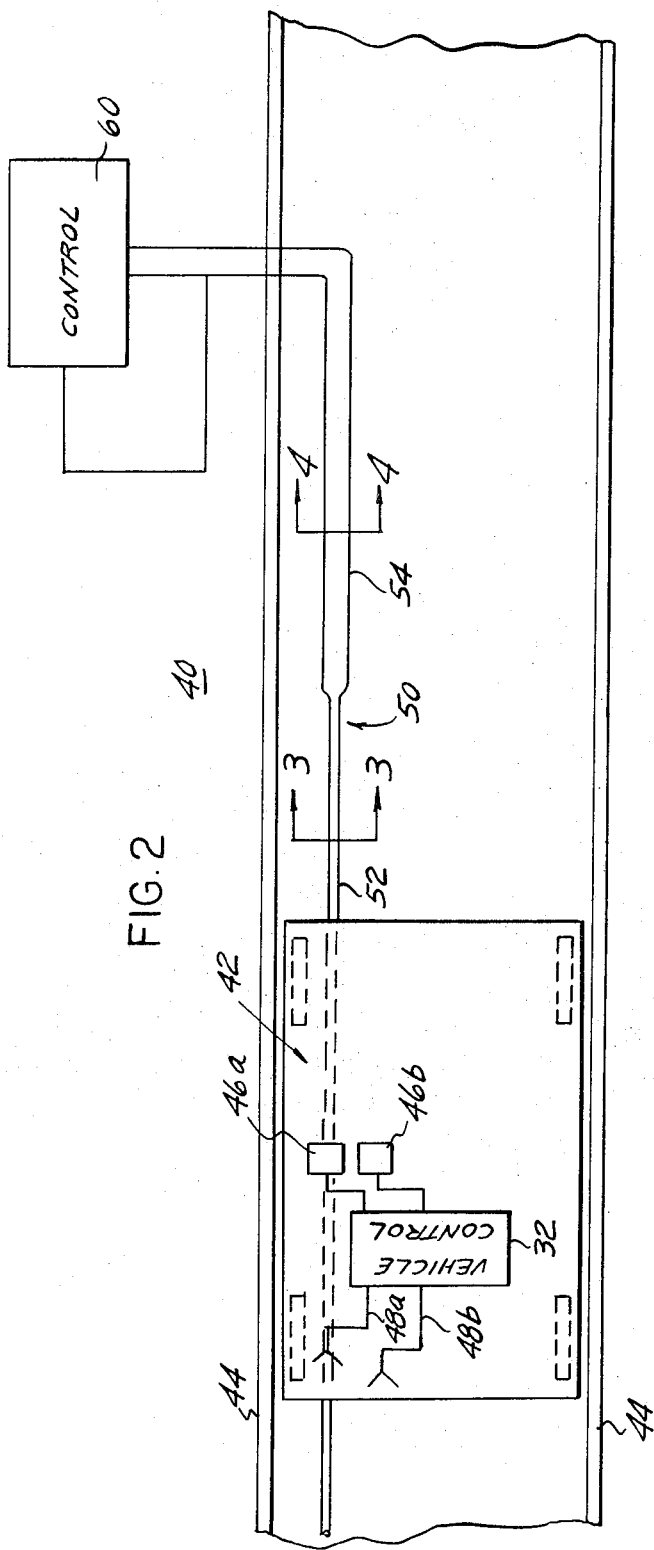
FIG. 2
FIG. 3
FIG. 4

SYSTEM FOR AUTOMATICALLY CONTROLLING A LAND VEHICLE

BACKGROUND OF THE INVENTION

1. Field of the Invention

Automatic vehicle control systems.

2. Brief Description of the Prior Art

Control apparatus for automatically controlled vehicle transporation system must generate signals causing each vehicle to proceed at a speed appropriate with the terrain on which that vehicle is located and also appropriate with the positions of other vehicles. The control apparatus must also be failsafe, or in other words designed so that a predetermined, safe series of events will occur if any control part fails. No vehicle may either be sent forward out of control or stopped in a position such that antoher vehicle may crash into it. Block control systems are known that satisfy these requirements. Block control systems comprise a series of consecutive, independent conductive loops disposed along a path. Each loop defines a block or section along the path, and is connected to a central control. One transmitter is mounted on each vehicle to induce signals in the loop opposite that vehicle. These induced signals are conducted back to the central control which processes them to identify the positions of the vehicles. The central control then transmits a control signal back to each loop opposite a vehicle. A receiver mounted on the vehicle senses this control signal and causes the vehicle to travel at a speed determined by the nature of the control signal.

The primary disadvantage of block control systems is that they are extremely expensive to install and maintain. The need for separate cables connecting each block or loop with a central control is one source of expense. In addition, amplifying transmitters and receivers must be placed at each loop in order to appropriately amplify the signals transmitted between that loop and the central control so that no signal will be asked by background noise and thus lost. It is very costly to install and maintain these amplifying transmitters and receivers.

In an effort to provide a cheaper control system, several systems have been designed in which a single conductor that crosses the vehicle path at predetermined intervals is used to transmit information between the vehicle and a central control. These systems are not block control systems and they are not failsafe. In one of these systems, conductor portions cross the vehicle path at regular intervals. A vehicle mounted transmitter induces a signal pulse in the conductor whenever the vehicle passes over one of these crossing conductor sections. Induced signal pulses are counted in order to identify vehicle location. One drawback of this system is that it is necessary to remember the pulse count in order to know the position of the vehicle. And, memory apparatus is subject to failure. In addition, there is no safe reaction that can be programmed into the system in the event of a failure such as an intermittent counter operation. If the system is designed to provide a low count in the event of such a failure, the vehicle will actually be ahead of its identified location and may therefore encounter a curve or obstacle at too fast a speed. Conversely, if the system is designed to provide a high count in the event of such a failure, the vehicle will be behind its identified position, and a rear end collision is likely to occur.

In another system employing a continuous conductor, portions of the conductor define sets of crossing lines at various positions along the vehicle path. Either the spacing between crossing lines or the number of lines is different for each set so that a different pulse code or sequence will be generated as the vehicle travels over different sets of crossing lines. The code or spacing between various received pulses is analyzed in order to identify vehicle position. One drawback of this system is that it also requires memory apparatus because a received pulse code must be identified and remembered in order to identify vehicle position. In addition, this system does not provide a continuous indication of vehicle position. No indication of position is provided while a vehicle travels between sets of crossing conductor sections.

In both the prior art block control systems and the control systems employing continuous conductors, each vehicle carries only one transmitter for transmitting position indicating signals and one receiver for receiving control signals.

SUMMARY OF THE INVENTION

This invention comprises an automatic vehicle control system in which a conductive cable runs along a path to be traveled by the vehicle. Consecutive cable sections along the path are offset so that the cable faces different positions on the vehicle as the vehicle moves to different locations along the path. Vehicle position along the path is determined by identifying the position on the vehicle facing the cable. Vehicle location can be identified with greater specificity than the length of one interval of one line by providing one or more additional lines, with the second line having a plurality of offset sections within each one section of the first line, and the third line having a plurality of offset sections within each section of the second line, and so forth. Each subsequent line thus has shorter sections than the preceding line and the relative position of the vehicle within one section of a preceding line is identified by identifying the position on the vehicle that the subsequent line faces.

Simple, reliable, and inexpensive apparatus can be used to idenfity vehicle position along a path by identifying the location on the vehicle facing a segmented line. In the embodiment illustrated herein, a plurality of signal transmitters are mounted on the vehicle at positions such that different transmitters align with the cable as the vehicle moves along the path from one cable section to the next. Each transmitter supplies signals to a conductor only when it is aligned with that conductor. The signals from each transmitter are distinguishable from those of all other transmitters. In order to identify vehicle position, receiving apparatus capable of identifying each of the transmitted signals are connected to each cable. Logic circuitry then identifies the combination of different signals received in any one instant from each of the different cables to precisely identify vehicle position along the path. Control signals for controlling the vehicle in accordance with its identified location are readily transmitted back to the vehicle along any of the cables. Receiving antennas are mounted on the vehicle in alignment with the different conductor sections so that control signals can be received by the vehicle regardless of vehicle position along the path.

The control system of this invention is more reliable than prior art systems using single continuous conductors to identify vehicle position because this invention does not require any memory or counting apparatus. Identification of the position on the vehicle that faces a segmented line running along the path traveled by the vehicle uniquely identifies vehicle position. In addition, this control system is substantially less expensive than prior art systems such as block control systems because simple signal detecting apparatus such as that described above can be used in embodiments of the invention. The control system of this invention is also substantially less expensive than prior art block control systems because there is no need for separate cables linking each block with a central control. And, there is no need to have elements such as signal transmitters and receivers disposed proximate each path block in order to identify vehicle loction and transmit information between the vehicle and the ground control.

BRIEF DESCRIPTION OF THE DRAWINGS

Further objects, features and advantages of this invention, which is defined by the appended claims, will become apparent from a consideration of the following description and accompanying drawings in which:

FIG. 2 is a schematic, plan, top view of a vehicle control system having a conductive cable with consecutive sections that are rotationally offset to face different locations on a vehicle; and FIGS. 3 and 4 are cutaway, cross-sectional views of the cable of FIG. 2 seen from the positions of lines 3—3 and 4—4, respectively, to better illustrate the rotational offset of the cable.

DETAILED DESCRIPTION OF THE PREFERRED EMBODIMENTS

Figure 1:
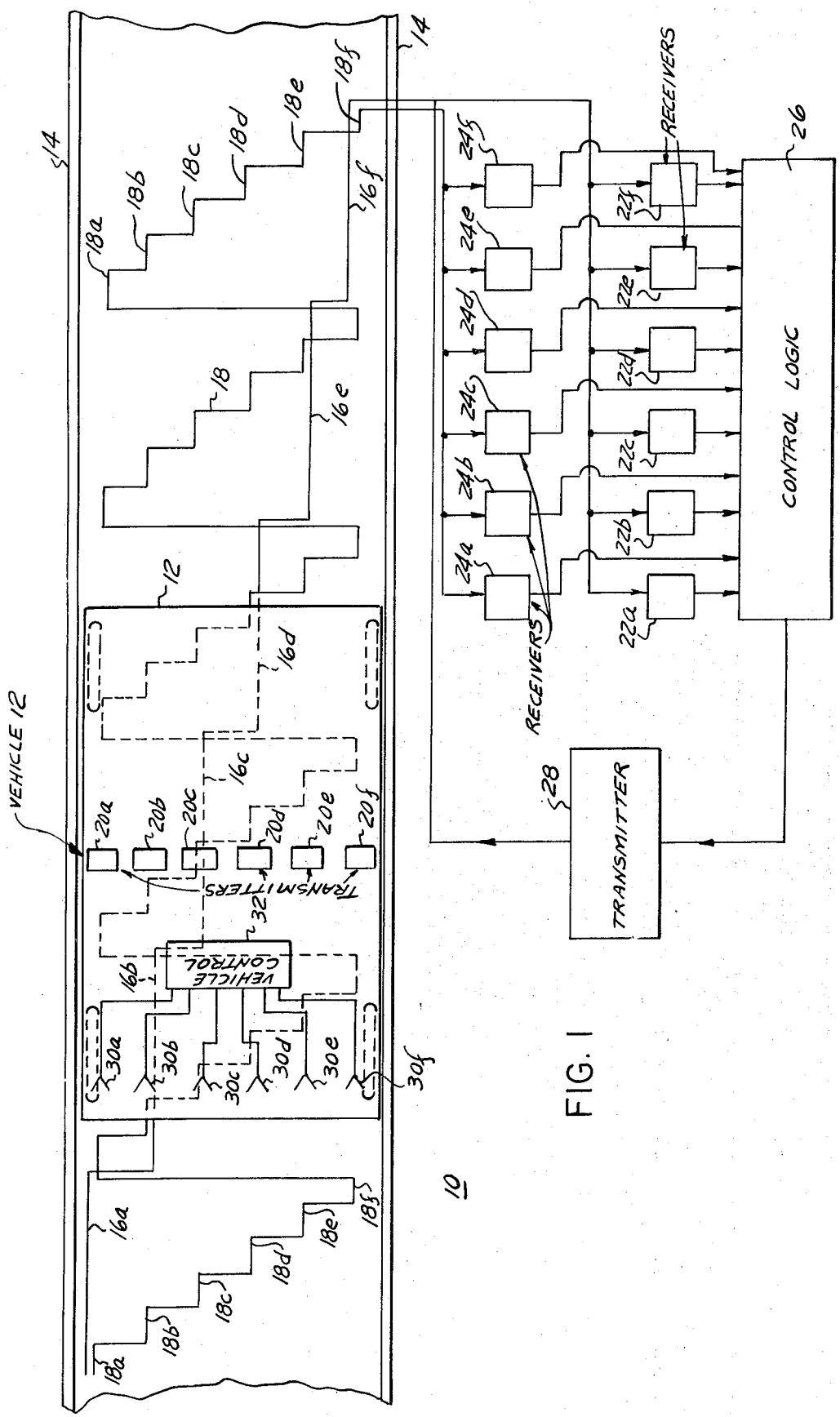
FIG. 1 is a schematic, plan, top view of a vehicle control system including two conductive cables having consecutive sections that are laterally offset to face different locations on a vehicle.

FIG. 1 illustrates a control system 10 for controlling the motion of a vehicle 12 traveling along a guideway 14. Two conductive cables 16 and 18 are disposed along guideway 14. Consecutive sections of cable 16, labeled 16a through 16f are offset to face different positions on the vehicle 12. Conductor 18 defines six spatially offset sections labeled 18a through 18f within each one section of conductor 16. Consecutive sections of conductor 16 thus align with different sections of conductor 18. Six transmitters labeled 20a through 20f for supplying signals to cables 16 and 18 are mounted on vehicle 12. The transmitters are positioned so that each transmitter aligns with a different cable section. The sections of cables 16 and 18 are sufficiently long so that only one transmitter aligns with and provides signals to a cable at one instant. Each transmitter transmits signals having different frequencies so that the signals from one transmitter are readily distinguished from those of the others. Different signals are thus supplied to cables 16 and 18 as vehicle 12 moves from one cable section to the next along guideway 14.

In order to identify the signals supplied to cables 16 and 18 and thereby identify vehicle position along guideway 14, the system 10 includes receivers 22a through 22f for receiving signals from cable 16 and receivers 24a through 24f for receiving signals from cable 18. Each one receiver is responsive to signals from only one of the vehicle mounted transmitters. That is, receivers 22a and 24a respond to signals from transmitter 20a, receivers 22b and 24b respond to signals from transmitters 20b, and so forth. Each receiver responds to signals by providing an output signal to a control logic circuit 26 which identifies the responding receivers. The identification of the receivers responding to signals from cables 16 and 18 identifies the vehicle mounted transmitter aligned with each of those cables and thus identifies vehicle position along guideway 14. Control logic circuit 26 is adapted to generate different predetermined control signals appropriate with different identified locations of vehicle 12. A transmitter 28 is connected to receive these control signals and transmit them along cable 16. Six receiving antennas 30a through 30f are mounted on the vehicle to receive these control signals and supply them to a conventional vehicle mounted control 32 which operates the vehicle in accordance with those control signals. Each receiving antenna 30a through 30f is positioned to align with one of the offset sections of conductor 16 so that vehicle 12 is able to receive control signals at any position along guideway 14.

In operation, each transmitter 20 continually provides output signals. Because consecutive sections of conductors 16 and 18 are spatially offset, different transmitters align with the cables as the vehicle 12 moves along guideway 14. Cables 16 and 18 receive signals only from an aligned transmitter. Since at any one instant, only one vehicle mounted transmitter will align with a cable, at any one instant, only one receiver 22 and one receiver 24 will respond to signals in cables 16 and 18 and provide a signal to logic circuitry. The remaining receivers supply no signal to circuit 26. Logic circuit 26 identifies the receivers providing signals to it and thus identifies vehicle position along guideway 14 since the particular receivers activated by signals from cables 16 and 18 are determined entirely by vehicle position along guideway 14. A precise identification of vehicle position is thus very easily obtained. That is, cable 16 defines six sections along guideway 14, and cable 18 defines six sections within each section of cable 18. The two cables thus define six times six, or 36 positions along the path. Thus, 36 different combinations of locations on vehicle 12 are faced by cable 16 and 18 as vehicle 12 travels along guideway 14, and 36 combinations of different signals are supplied to cable 16 and 18. However, it is only necessary for receivers 22 to identify six different signals from cable 16 and for receivers 24 to identify six different signals from cable 18, and for logic circuit 26 to identify the combination of different signals supplied to the two cables 16 and 18 at any one instant in order to identify the position of vehicle 12 along guideway 14 at that instant.

Logic circuit 26 generates a control signal appropriate with the identified location of vehicle 12. For example, if vehicle 12 is at a position where the guideway 14 in front of it is straight and runs over level ground, control circuit 26 provides an output directing the vehicle to move at a faster rate than it would provide if the vehicle were entering a sharp curve. Transmitter 28 transmits this control signal along cable 16. The vehicle mounted antenna 30 aligned with cable 16 receives this control signal and supplies it to control 32 which causes vehicle 12 to move accordingly.

FIGS. 2 through 4 illustrate a second vehicle control system 40 for controlling the motion of a vehicle 42 moving along a guideway 44. Mounted on vehicle 42 are two transmitters 46a and 46b which transmit signals having different frequencies, two receiving antennas 48a and 48b, and a control circuit 32 which respond to signals from antenna 48. A conductive cable 50 is disposed along guideway 44. As is best seen in FIGS. 3 and 4, cable 50 includes two sections 52 and 54 which are rotationally offset to electrically face different locations on vehicle 42. That is, as is best illustrated in FIGS. 3 and 4, cable 50 is formed from two parallel conductors 56 and 58 which define a closed loop. Cable section 52 electrically faces and communicates with transmitters 46a and antenna 48a. However, section 54 is rotated to electrically face and communicate with transmitter 46b and antenna 48b. Cable 50 connects with a ground based control 60 which identifies vehicle position and generates appropriate control signals.

Operation of control system 40 is similar to that of control system 10. Different transmitters align with cable 50 as vehicle 42 moves along guideway 44. Vehicle position is identified by control apparatus 60 which receives and identifies signals from cable 50. An appropriate control signal is transmitted from control 60 along cable 50 back to vehicle 42 which receives that control signal and is caused by control 32 to opeate accordingly.

Having thus described several embodiments of this invention, a number of modifications will readily occur to those skilled in the art. As one example of such a modification, the control systems have been illustrated for controlling only a single vehicle to simplify the explanation of this invention. A system for identifying the positions of many vehicles and for controlling their motions could be constructed in which the signals transmitted between each one vehicle and central control are distinguishable from those for all other vehicles. One way of obtaining signals for each vehicle that are distinguishable from those for all other vehicles is to transmit signals intermittently rather than continuously, with signals for each different vehicle transmitted in a different part of a time interval. As another example of a modification to the illustrated embodiments, twelve separate signal identifying receivers 22a-f and 24a-f are shown in FIG. 1 to clearly illustrate the signal identification required to identify vehicle location along guideway 14. However, receiving elements capable of identifying several different signals are known and can be used in place of the illustrated receivers. As a third example of a modification of the preferred embodiments, FIG. 2 provides a simplified illustration of rotational offset in an uncomplicated control system having a single communication cable. Other systems having a cable with some sections laterally offset and others rotationally offset from each other to face a greater number of different positions on the vehicle and thus identify a greater number of different vehicle positions along a path can be constructed. Or, systems employing several cables having various sections rotationally offset to obtain different combinations of facing relationships between the cables and a vehicle can also be constructed.

Therefore, what is claimed is:

1. Vehicle control system for automatically identifying the position of a vehicle along a path to thereby facilitate automatic control of the motion of said vehicle comprising:
   a conductor disposed along the path with consecutive conductor sections being spatially offset from each other to face different locations on the vehicle as said vehicle travels along consecutive sections of said path;
   a plurality of vehicle mounted signal transfering elements for transfering signals between said vehicle and said conductor when aligned with a section of said conductor, each of said transfering elements being mounted at a different location on said vehicle to face a different offset section of said conductor and each element generating a signal distinguishable from the signals supplied by all other transfering elements and thereby transfer distinguishable signals between said vehicle and said conductor when said vehicle is located at a different position along said path; and
   identifying means responsive to each of said distinguishable signals for identifying the transfering element facing said conductor and transfering information between said vehicle and said conductor to thereby identify vehicle position along said path.

2. The vehicle control system of claim 1 further including:
   a second conductor disposed along said path having a plurality of spatially offset consecutive sections within the path distance defined by each one section of said conductor, consecutive sections of said second conductor being positioned to align with different vehicle mounted transfering elements as said vehicle moves along said path; and
   second identifying means responsive to each of said distinguishable signals for identifying the transfering element facing said second conductor to more precisely determine vehicle position.

3. The vehicle control system of claim 2 in which:
   said plurality of vehicle mounted transferring elements comprise N transfering elements generating N distinguishable signals, where N is an integer;
   N consecutive section of said conductor are disposed along a predetermined path length with each section positioned to face a different transfering element;
   said identifying means is constructed to provide N different output signals, each output signal identifying one of said N elements;
   said second conductor includes N spatially offset sections within the path length defined by each one section of said conductor, each of said N section of said second conductor being offset to face a different transfering element;
   said second identifying means is constructed to provide N different output signals, each output signal identifying one of said N elements; and
   the control system further includes logic circuitry for receiving and identifying the combination of signals provided by said identifying means and said second identifying means, said logic circuitry receiving N times N different combinations as said vehicle moves along said predetermined path length and thus uniquely identifying vehicle position along said path length to an accuracy of the length of one section of said second conductor.

4. The vehicle control system of claim 3 in which:
said vehicle mounted signal transfering elements comprise signal transmitters, each transmitter supplying signals to any conductor section aligned with said transmitter, the signals from each transmitter being distinguishable from the signals supplied by all other of said transmitters; and
said identifying means and said second identifying means comprise means for receiving signals from said conductor and said second conductor respectively and identifying the received signal.

5. The vehicle control system of claim 1 in which the control system further includes:
control signal generating apparatus for supplying a control signal to said conductor determined at least in part by said identified vehicle position along said path; and
vehicle mounted means for receiving said control signal from said conductor and controlling the motion of said vehicle in accordance with said control signal.

6. The vehicle control system of claim 5 in which:
each of said vehicle mounted transmitter trnsmits signals having different frequencies; and
said identifying means comprise means for identifying the frequency of said signals received from said conductor.

7. The vehicle control system of claim 1 in which said consecutive sections of said line are disposed substantially parallel to said path and are offset from each other along a direction substantially perpendicular to said path.

8. A vehicle control system for automatically identifying the position of a vehicle along a path to thereby facilitate automatic control of the motion of said vehicle comprising:
a plurality of transmitters mounted on said vehicle at predetermined locations transverse to said path, each transmitter generating a signal having a frequency different from the frequencies generated by all other transmitters;
two parallel conductors disposed substantially parallel to said path for receiving the signals generated by said transmitters, said parallel conductors forming a closed loop having an electrical face preferentially receiving signals generated by a transmitter disposed in the plane defined by said parallel conductors, said parallel conductor further having a plurality of consecutive sections wherein the plane defined by said parallel conductors in each consecutive section are rotationally disposed from each other to cause said closed loop to electrically face different transmitters on said vehicle and preferentially receive the signal from the transmitter being electrically faced as the vehicle is proximate different sections of said parallel conductors; and
identifying means for identifying the frequency of the signal being preferentially received to thereby identify the position of the vehicle along said path.

* * * * *